(12) United States Patent
Seki

(10) Patent No.: US 7,384,151 B2
(45) Date of Patent: Jun. 10, 2008

(54) PROJECTOR

(75) Inventor: Hideya Seki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 81 days.

(21) Appl. No.: 11/074,638

(22) Filed: Mar. 9, 2005

(65) Prior Publication Data

US 2005/0201107 A1    Sep. 15, 2005

(51) Int. Cl.
*G03B 21/16* (2006.01)
*G03B 21/18* (2006.01)
*G03B 21/00* (2006.01)

(52) U.S. Cl. .......................... 353/52; 353/31

(58) Field of Classification Search ................ 353/30, 353/31, 52, 54, 57, 58, 60, 61
See application file for complete search history.

(56) References Cited

U.S. PATENT DOCUMENTS

| | | | |
|---|---|---|---|
| 6,846,080 | B2 | 1/2005 | Inoue et al. |
| 2001/0013924 | A1* | 8/2001 | Yokoyama et al. ........... 353/52 |
| 2005/0018141 | A1* | 1/2005 | Hosaka ........................ 353/31 |
| 2005/0128441 | A1* | 6/2005 | Morgan ...................... 353/102 |
| 2005/0254013 | A1* | 11/2005 | Engle et al. ................. 353/52 |

FOREIGN PATENT DOCUMENTS

| | | |
|---|---|---|
| JP | A 04-073733 | 3/1992 |
| JP | A 04-271334 | 9/1992 |
| JP | A 05-161119 | 3/1993 |
| JP | A 11-064849 | 3/1999 |
| JP | A 2001-281613 | 10/2001 |
| JP | A 2002-196427 | 7/2002 |
| JP | A 2003-101081 | 4/2003 |
| JP | A 2004-070065 | 3/2004 |

* cited by examiner

*Primary Examiner*—Rodney E Fuller
(74) *Attorney, Agent, or Firm*—Oliff & Berridge, PLC

(57) ABSTRACT

To provide a projector capable of obtaining a bright projection image with good color balance by efficient cooling in the case of using light source parts having different wavelength characteristics, a projector has plural light source parts to supply illumination lights, a cooling part to cool light source parts, spatial light modulators to modulate the illumination lights from the light source parts according to image signals, and a projection lens to project the lights modulated by the spatial light modulators, and the light source parts provide different amounts of illumination lights that change depending on the temperature changes of the light source parts. The cooling part cools the light source parts so that they provide amounts of light within a predetermined range with the amount of illumination light provided when one of the light source parts are at a reference temperature.

9 Claims, 7 Drawing Sheets

F I G. 7
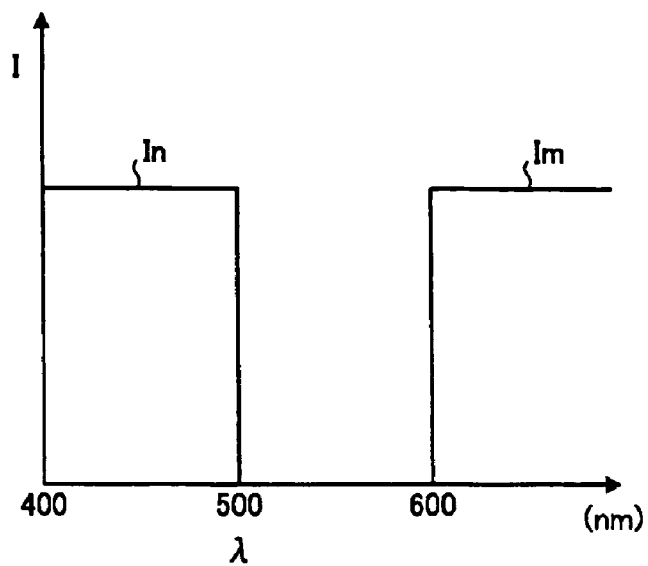
F I G. 8
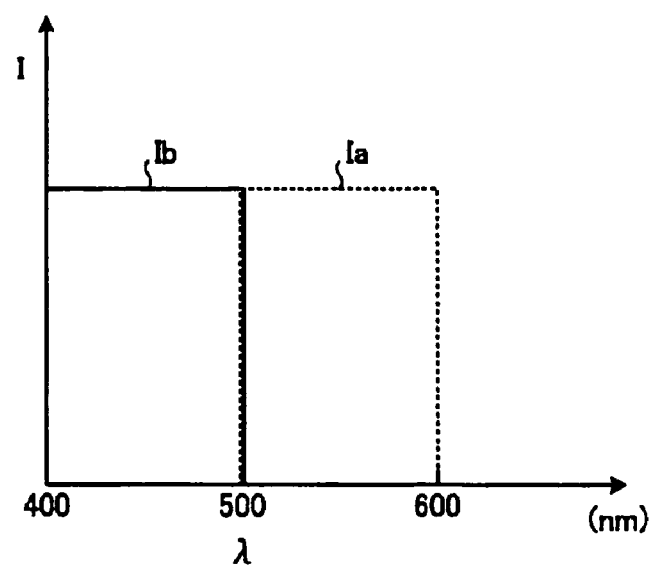

PROJECTOR

BACKGROUND

Exemplary aspects of the present invention relate to a projector, and specifically, to a projector technology using solid light emitting elements as light source parts.

A light source using solid light emitting elements has been used as a light source of a projector. Among the solid light emitting elements, the progress in development and enhancement of a light emitting diode (hereinafter, "LED") is significant. In addition to low-power LED products for display, high-power LED products for illumination are being developed. The LED is characterized by having a microminiature form, ultralight weight, and long life. From these features, the LED may be used especially for a light source of a compact portable projector. Further, the LED can supply illumination light with high color purity having a specific wavelength range. Accordingly, by using LEDs having different wavelength characteristics from each other as light sources of a projector, a color image with high color reproducibility can be obtained.

In the present circumstances, the efficiency of an LED obtained by rated current is on the order of ½ to ⅓ of that of an ultra high pressure mercury lamp. Accordingly, in the case of using an LED for a projector, it is necessary to form a construction by which a large amount of light is obtained. The rated current of the LED depends on the amount of heat generation of the LED. By efficiently releasing heat from the LED, the rated current can be made larger. Accordingly, a large amount of light can be obtained by forming a projector with high heat release efficiency. Constructions for realizing efficient heat release by cooling a light source in an image display device or the like are proposed in Publication of Japanese Patent Application No. Hei-5-2215 and Publication of Japanese Utility Model Application No. Sho-62-55456.

SUMMARY

The maximum amount of light of the LED also depends on efficiency other than the rated current. The LED is known to have a character that the illumination efficiency is reduced due to a rise in temperature. It is considered that, in the case where current is injected into the LED to the rated limit, the LED cannot avoid higher temperatures due to its own heat generation. When the illumination efficiency is reduced due to a rise in temperature, the projection image from the projector becomes dark. Further, it is known that the rate of reduction in the amount of illumination light due to temperature rise differs according to wavelength characteristics of the LED. For example, the illumination efficiency of an LED for red (hereinafter, "R light") is more largely reduced due to temperature rise compared to an LED for green (hereinafter, "G light") and an LED for blue (hereinafter, "B light"). In the case of using LEDs having different wavelength characteristics from each other, when changes in illumination efficiency are different depending on the wavelength characteristics of the LEDs, not only the projection image becomes dark, but also the color balance changes. To reduce the change in the color balance, it is necessary to make the illumination efficiency of the LEDs for the respective color lights substantially uniform.

In both Publication of Japanese Patent Application No. Hei-5-2215 and Publication of Japanese Patent Application No. Sho-62-55456, constructions to efficiently and substantially uniformly cool the entire projector are proposed; However, in order to efficiently cool LEDs having different wavelength characteristics, it is necessary to cool the respective LEDs according to the amounts of change in illumination efficiency. Accordingly, it is difficult to reduce the change in color balance by efficient cooling in the related art constructions to substantially uniformly cool the entire projector.

In order to make the color balance of the projection image substantially constant, it is conceivable that the amount of current injected into the LED is adjusted. In the case where current is injected into the LEDs for the respective color lights to the rated current, the amount of current injected into the LEDs can be adjusted only by being reduced. For example, the driving current of the G-light LED and B-light LED is reduced according to the amount of light of the R-light LED with the most reduced illumination efficiency. When the driving current is reduced, the projection image becomes even darker. Thus, there is a problem that it is difficult to obtain a bright projection image with good color balance by efficient cooling in the case of using the solid light emitting elements having different wavelength characteristics. Exemplary aspects of the invention address and/or solve the above described and/or other problems, and provide a bright projector capable of obtaining a projection image with good color balance in the case of using light source parts having different wavelength characteristics.

In order to address and/or solve the above described and/or other problems, a projector according to an exemplary aspect of the invention includes: a plurality of light source parts to supply illumination lights; a cooling part to cool the light source parts; spatial light modulators to modulate the illumination lights from the light source parts according to image signals; and a projection lens to project the lights modulated by the spatial light modulators. The light source parts provide different amounts of the illumination lights that change depending on temperature changes of the light source parts. The cooling part cools the light source parts so as to make the parts provide amounts of light within a predetermined range with the amounts of the illumination lights provided, when the light source parts are at a reference temperature, as a reference.

The cooling part cools the respective light source parts so as to make the parts provide amounts of light within a predetermined range with the amount of illumination lights provided, when the light source parts are at a reference temperature, as a reference. Since the parts are made to provide amounts of light within a predetermined range with the amounts of illumination lights provided, when the light source parts are at a reference temperature, as a reference, even when the illumination efficiency changes according to the wavelength characteristics of the light source parts, the respective light source parts can be made to provide amounts of light within a predetermined range. Accordingly, the change in color balance can be reduced by efficient cooling.

Further, using the cooling part, even when the illumination efficiency of the light source parts deteriorates due to temperature rise, the deterioration of the illumination efficiency can be reduced. Furthermore, when current is injected into the respective light source parts to the rated limit, there is no need to reduce the amount of current for color balance adjustment. Since there is no need to reduce the driving current for the light source parts, the projection image no longer becomes dark because of color balance adjustment. Since there is deterioration in illumination efficiency due to temperature rise, or further, a need to reduce the driving current for color balance adjustment, a bright projection image is obtained. Thereby, in the case of using light source parts having different wavelength characteristics, a projector capable of obtaining a bright projection image with good color balance by efficient cooling can be obtained.

Further, according to an exemplary embodiment of the invention, it is desired that the cooling part cools the light source parts with the strengths according to amounts of change of the illumination lights depending on the temperature changes of the light source parts. Even when the change in illumination efficiency differs according to the wavelength characteristics of the light source parts, by cooling the light source parts with strengths depending on the amounts of changes of illumination lights, the respective light source parts can be made to provide amounts of light within a predetermined range. For, example, when the illumination lights largely decrease depending on the temperature rise of the light source parts, by cooling these light source parts with large strength, the amounts of light can be made within a predetermined range. Contrary, in the case where the amount of reduction of the illumination lights is small even when the temperature of the light source parts rises, the amounts of light can be made within a predetermined range without cooling these light source parts with large strength. Thereby, illumination lights can be made into amounts of light within a predetermined range by efficient cooling.

Further, according to an exemplary embodiment of the invention, the light source parts may include a red-light light source part to supply the illumination light as red light, and the cooling part may cool the red-light light source part with strength larger than the strengths to cool the light source parts other than the red-light light source part. The R-light LED provides illumination efficiency remarkably deteriorated due to temperature rise. For example, in the case of using R-light LED, G-light LED, and B-light LED as light source parts, the R-light LED provides a larger reduction amount of illumination efficiency due to temperature rise than those by the G-light LED and the B-light LED. Accordingly, by cooling the R-light LED more strongly than the LEDs for the other color lights, a projection image with good color balance is obtained.

Further, as an exemplary embodiment of the invention, the cooling part may be a cooling fluid supply part to supply a cooling fluid to the light source parts, and the cooling fluid supply part may supply the cooling fluid so as to allow the cooling fluid to pass the light source parts in decreasing order of amounts of change of the illumination lights depending on the temperature changes of the light source parts. The light source parts release heat utilizing heat transfer by the cooling fluid. The cooling fluid flows near the light source parts while drawing heat from the light source parts. The heat transferred to the cooling fluid is finally released into the atmosphere. The light source part through which the cooling fluid passes earlier of the light source parts is cooled with larger strength than the other light sources by the passing of the cooling fluid before taking heat. Accordingly, by allowing the cooling fluid pass the light source parts in decreasing order of amounts of change of illumination lights depending on the temperature changes of the light source parts, the light source parts can be cooled according to the amounts of change of illumination lights. Further, since cooling fluid may be allowed to pass the light source parts in decreasing order of amounts of change of illumination lights, the light source parts can be cooled according to the amounts of change in the illumination lights by a simple construction. Thereby, the respective light source parts can be cooled efficiently according to the wavelength characteristics by a simple construction.

Further, as an exemplary embodiment of the invention, the projector may include a plurality of the cooling parts, and the cooling parts may be provided in correspondence with the light source parts. By providing the cooling part with respect to each light source part, the cooling strengths by the respective cooling parts can be set appropriately. Since the cooling strengths can be set appropriately with respect to each light source part, the respective light source parts can be cooled easily according to the amounts of change of illumination lights. Thereby, the respective light source parts can be cooled easily and efficiently according to the wavelength characteristics.

Further, as an exemplary embodiment of the invention, the cooling parts may be heat releasing parts to release heat from the corresponding light source parts. Using heat releasing parts as the cooling parts, the heat release efficiency of the heat releasing parts can be set appropriately. Thereby, the respective light source parts can be cooled easily and efficiently according to the wavelength characteristics.

Further, as an exemplary embodiment of the invention, the cooling parts may be cooling fluid supply parts to supply a cooling fluid to the corresponding light source parts. Using cooling fluid supply parts as the cooling parts, the amount of supplied cooling fluid by the cooling fluid supply parts can be set appropriately. Thereby, the respective light source parts can be cooled easily and efficiently according to the wavelength characteristics.

Further, as an exemplary embodiment of the invention, the projector may further have cooling fluid inflow ports provided in correspondence with the light source parts, and the cooling part may be a cooling fluid supply part to supply a cooling fluid to the light source parts, and the cooling fluid inflow ports may have openings with predetermined areas and further provided in predetermined positions in relation to the corresponding light source parts.

The larger the opening areas of the cooling fluid inflow ports, the larger the volumes of the cooling fluid to be supplied to the corresponding light source parts become. The volumes of the cooling fluid to be supplied to the light source parts can be set appropriately according to the opening areas of the cooling fluid inflow ports. Further, by providing the cooling fluid inflow ports in predetermined positions in relation to the corresponding light source parts, the cooling fluid passing a specific light source part is allowed to travel substantially in a straight line. As the cooling fluid passing the light source part takes a channel closer to the straight line, a larger amount of cooling fluid can be brought into contact with the light source part at higher speed, and thereby, the part can be cooled more strongly. Thus, the cooling strengths can be set appropriately according to the positions and opening areas of the cooling fluid inflow ports. Thereby, the light source parts can be cooled so that the illumination lights may be into amounts of light within a predetermined range.

Further, as an exemplary embodiment of the invention, the light source parts may include a first color-light light source part to supply the illumination light as a first color light, a second color-light light source part to supply the illumination light as a second color light, and a third color-light light source part to supply the illumination light as a third color light. The projector may further have: a light combining system having a first dichroic film to reflect the second color light and transmit the first color light and the third color light and a second dichroic film to reflect the third color light and transmit the first color light and the second color light to combine the first color light, the second color light, and the third color light to output the light in a direction toward the projection lens; and a cooling fluid inflow port provided near the first color-light light source part into which the cooling fluid flows, and the first color-light light source part provides a larger amount of change of the illumination light depending on the temperature changes of the light source parts compared to the second color light source part, and the third color-light light source part, and the light combining system is provided between the first color-light light source part and the projection lens.

The light combining system combines the respective color lights by transmitting the first color light to allow the light to travel in a straight line. When such a light combining system is provided, the first color-light light source part is provided at the opposite side to the projection lens relative to the light combining system. By providing the first color-light light source part at the opposite side to the projection lens, space within the projector can be utilized without waste and large space can be secured around the first color-light light source part. When large space can be taken around the first color-light light source part, large space to release heat of the first color-light light source part can be taken and a large-scaled radiator can be provided. Furthermore, by providing a cooling fluid inflow port near the first color-light light source part, the cooling fluid can be supplied to the first color-light light source part earlier than to the light source parts for the other color lights, and the first color-light light source part can be cooled efficiently. By adopting a construction in which the cooling fluid travels in a straight line from the cooling fluid inflow port toward the projection lens, a large amount of high-speed cooling fluid can be supplied from the cooling fluid inflow port to the first color-light light source part. Thereby, the first color-light light source part providing the largest amount of change of illumination light depending on the temperature change of the light source part can be cooled efficiently.

BRIEF DESCRIPTION OF THE DRAWINGS

FIG. 7 is an schematic of the reflection characteristic of the dichroic mirror; and FIG. 8 is a schematic of the reflection characteristic of the dichroic mirror.

DETAILED DESCRIPTION OF EXEMPLARY EMBODIMENTS

Figure 1:
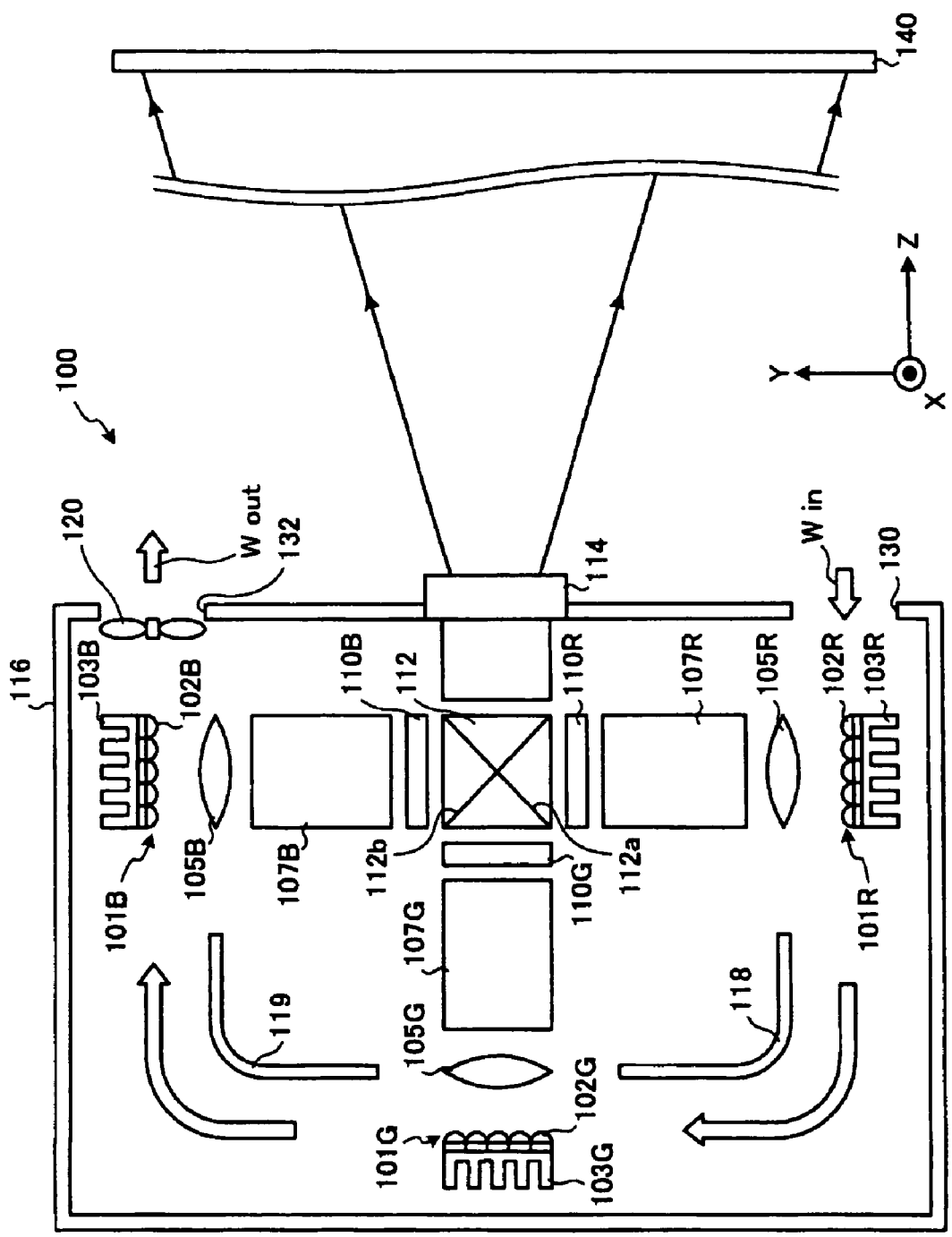
FIG. 1 is a schematic of the construction of the projector according to exemplary embodiment 1 of the invention.

Hereinafter, exemplary embodiments of the invention will be described by referring to the drawings.

Exemplary Embodiment 1

FIG. 1 shows a schematic of a projector 100 according to exemplary embodiment 1 of the invention. In the exemplary embodiment, first, the schematic construction of the projector 100 will be described, and then, a construction for cooling the respective light source parts will be described. The projector 100 has an R-light LED 102R as the first color-light light source part, a G-light LED 102G as the second color-light light source part, and a B-light LED 102B as the third color-light light source part.

The R-light light source unit 101R is formed by assembly of plural R-light LEDs 102R. The G-light light source unit 101G is formed by assembly of plural G-light LED 102G. The B-light light source unit 101B is formed by assembly of plural B-light LED 102B. Heat sinks 103R, 103G, and 103B are provided in the light source units 101R, 101G, and 101B for the respective color lights, respectively. By providing the heat sinks 103R, 103G, and 103B, the heat from the LEDs 102R, 102G, and 102B for the respective color lights can be released into the atmosphere.

The R light from the R-light LED 102R is converted into collimated light substantially in parallel by a collimator lens 105R, and then, enters a rod integrator 107R as a light guiding system. The rod integrator 107R makes the amount of light distribution of the R light substantially uniform. The rod integrator 107R is formed by a transparent glass member having a section substantially in a rectangular shape. The light entering the rod integrator 107R travels within the rod integrator 107R while repeating total reflection at the interface between the glass member and air.

The rod integrator 107R is not limited to being formed by the glass member and may have a hollow structure with an inner surface formed of a reflection surface. In the case of the rod integrator with an inner surface formed of a reflection surface, the light entering the rod integrator travels within the rod integrator while repeating reflection on the reflection surface. Further, the rod integrator may be formed by combining the glass member and the reflection surface.

The light output from the rod integrator 107R enters the R-light liquid crystal type spatial light modulator 110R as a spatial light modulator for R light. The R-light liquid crystal type spatial light modulator 110R is a transmissive liquid crystal display device to modulate the R light from the R-light LED 102R according to image signals and output the light. The light modulated by the R-light liquid crystal type spatial light modulator 110R enters a cross dichroic prism 112.

G light from the G-light LED 102G is converted into collimated light substantially in parallel by a collimator lens 105G, and then, enters a rod integrator 107G as a light guiding system. The rod integrator 107G makes the amount of light distribution of the G light substantially uniform. The construction of the rod integrator 107G is the same as the above described rod integrator 107R. The light output from the rod integrator 107G enters the G-light liquid crystal type spatial light modulator 110G as a spatial light modulator for G light. The G-light liquid crystal type spatial light modulator 110G is a transmissive liquid crystal display device to modulate the G light from the G-light LED 102G according to image signals and output the light. The light modulated by the G-light liquid crystal type spatial light modulator 110G enters the cross dichroic prism 112.

B light from the B-light LED 102B is converted into collimated light substantially in parallel by a collimator lens 105B, and then, enters a rod integrator 107B as a light guiding system. The rod integrator 107B makes the amount of light distribution of the B light substantially uniform. The construction of the rod integrator 107B is the same as the above described rod integrator 107B. The light output from the rod integrator 107B enters the B-light liquid crystal type spatial light modulator 110B as a spatial light modulator for B light. The B-light liquid crystal type spatial light modulator 110B is a transmissive liquid crystal display device to modulate the B light from the B-light LED 102B according to image signals to output the light. The light modulated by the B-light liquid crystal type spatial light modulator 110B enters the cross dichroic prism 112.

The liquid crystal type spatial light modulators 110R, 110G, and 110B for the respective color lights modulate polarized light in a specific vibration direction according to image signals. Accordingly, it is desired that polarization conversion elements to convert incident light into polarized light in a specific vibration direction are appropriately provided. By providing the polarization conversion elements, the light entering the liquid crystal type spatial light modulators 110R, 110G, and 110B for the respective color lights can be increased. Therefore, by providing the polarization conversion elements, lights of the respective colors are efficiently utilized to obtain bright images.

The cross dichroic prism 112 is formed by arranging a first dichroic film 112a and a second dichroic film 112b in an X-shape. The first dichroic film 112a reflects R light and transmits G light and B light. The second dichroic film 112b reflects B light and transmits G light and R light. The R light entering the cross dichroic prism 112 is reflected by the first dichroic film 112a and travels toward a projection lens 114.

The G light entering the cross dichroic prism 112 is transmitted through the first dichroic film 112a and the second dichroic film 112b and travels toward the projection lens 114. The B light entering the cross dichroic prism 112 is reflected by the second dichroic film 112b and travels toward the projection lens 114. Thereby, the cross dichroic prism 112 combines the modulated lights of the respective colors and outputs the lights toward the projection lens 114. The projection lens 114 projects the modulated lights of the respective colors onto a screen 140. If the LEDs 102R, 102G, and 102B for the respective color lights can be sufficiently cooled by driving a cooling fan 120, which will be described later, the units may adopt constructions in which the heat sinks 103R, 103G, and 103B are not provided.

Next, a construction to cool the light source parts 102R, 102G, and 102B for the respective color lights will be described. A casing 116 of the projector 100 is provided with an intake port 130 and an exhaust port 132. The intake port 130 is provided on the XY plane on which the projection lens 114 is provided near the R-light LED 102R in the casing 116. The exhaust port 132 is provided on the XY plane of the casing 116 near the B-light LED 102B. The exhaust port 132 is provided with the cooling fan 120 as a cooling fluid supply part. When the cooling fan 120 is driven, air as a cooling fluid is exhausted from inside the casing 116 at the exhaust port 132. Then, by being exhausted from the exhaust port 132 by the driving of the cooling fan 120, the air as the cooling fluid flows from the outside of the casing 116 into the intake port 130.

The air Win flowing into the casing 116 from the intake port 130 by the driving of the cooling fan 120 first passes near the R-light LED 102R. At this time, the air near the R-light LED 102R flows while drawing heat generated by the R-light LED 102R. The air that has passed near the R-light LED 102R travels along a cooling guard 118 provided between the R-light LED 102R and the G-light LED 102G, and then, passes near the G-light LED 102G.

The air near the G-light LED 102G also flows while drawing heat generated by the G-light LED 102G. Furthermore, the air that has passed near the G-light LED 102G travels along a cooling guard 119 provided between the G-light LED 102G and the B-light LED 102B, and, in turn, travels near the B-light LED 102B. Then, after flowing while drawing heat generated by the B-light LED 102B, the air Wout is exhausted from the exhaust port 132. The cooling fan 120 supplies air to the LEDs 102R, 102G, and 102B for the respective color lights by thus allowing the air to flow within the casing 116.

The air from the intake port 130 sequentially passes through the R-light LED 102R, the G-light LED 102G, and the B-light LED 102B, and then, is exhausted from the exhaust port 132. The air Win from the outside of the casing 116 first passes near the R-light LED 102R. The R-light LED 102R that the air Win from the outside of the casing 116 first passes is cooled more strongly than the other LEDs 102G and 102B for other color lights. The G-light LED 102G is cooled by the air that has received the heat transfer from the R-light LED 102R. The B-light LED 102B is cooled by the air that has received the heat transfer from the R-light LED 102R and the G-light LED 102G. Therefore, they are cooled more strongly in the order of the R-light LED 102R, the G-light LED 102G, and the B-light LED 102B.

If it is possible that the air is allowed to pass in the order of the R-light LED 102R, the G-light LED 102G, and the B-light LED 102B, the cooling guards 118 and 119 may not be provided. The air that has drawn heat from the LEDs 102R, 102G, and 102B for the respective color lights is exhausted from the exhaust port 132. Thereby, the heat from the respective LEDs is finally released into the atmosphere. The LEDs 102R, 102G, and 102B for the respective color lights can release heat utilizing the heat transfer by the air and allowing the air to flow.

In order to obtain a bright projection image, it is conceivable that the number of the LEDs 102R, 102G, and 102B for the respective color lights is increased to obtain a larger amount of light. In the projector 100, in the optical system including the light source parts and the spatial light modulators, spatial broadening in which effectively handled luminous fluxes exist, the product of area and solid angle (etendue, Geometrical Extent) is preserved. There is a limit for an angle at which light that can be modulated effectively by the spatial light modulator is taken. Accordingly, when the spatial broadening of the light source becomes larger by arraying the LEDs 102R, 102G, and 102B for the respective color lights, the luminous fluxes from the light sources become difficult to be used effectively. Therefore, only by simply increasing the number of the LEDs 102R, 102G, and 102B for the respective color lights alone will cause a deterioration in the illumination efficiency.

Accordingly, it is conceivable that the LEDs 102R, 102G, and 102B for the respective color lights are driven with rated current other than the increase in the number of the LEDs 102R, 102G, and 102B for the respective color lights. Furthermore, since the rated current of the LED depends on the amount of heat generation of the LED, the rated current can be increased by increasing the heat release efficiency of the LED. Accordingly, a larger amount of light can be obtained by making the projector 100 have a high heat release efficiency.

The maximum amount of light of the LED also depends on an efficiency other than the rated current. The LED is known to have a character that the illumination efficiency decreases due to temperature rise. In the case where current is injected into the LED to the rated limit, the LED's temperature increase by its own heat generation. When the illumination efficiency is decreased due to temperature rise, the projection image from the projector 100 becomes dark. Further, it is also known that the rate of decreasing the amount of the illumination light due to temperature rise differs according to the wavelength characteristic of the LED.

In the projector 100 of the exemplary embodiment, the R-light LED 102R has decreased illumination efficiency due to temperature rise more drastically compared to the G-light LED 102G and the B-light LED 102B. Here, the illumination efficiency is compared to the amount of illumination light when the temperature of the LED rises to 100° C. with the amount of illumination light at the reference temperature 25° C. as 100%. At this time, the amount of illumination light of the B-light LED 102B decreases on the order of 6%, while the amounts of illumination light of the G-light LED 102G and the R-light LED 102R decrease about 30% and more than 60%, respectively. Thus, when the amounts of illumination light decrease in different amounts of change with respect to each color light, the color balance of the projection image will be changed. The change in the color balance of the projection image causes deterioration in color reproducibility. Especially, images with low color reproducibility continue to be displayed when the LED is in the thermal equilibrium state in which the LED is substantially at constant temperature.

For example, in order to hold the color balance, it is considered that the respective LEDs are cooled so that the amounts of light after temperature rise may fall within the amount of light ±5% with the amount of illumination light at 25° C. as reference. If the temperature of the LEDs 102R, 102G, and 102B for the respective color lights rises to 100° C. by being driven, for example, it is necessary to cool the R-light LED 102R to 30° C., while the G-light LED 102G may be cooled to 50° C. and the B-light LED 102B may be cooled to 95° C. Thus, the color balance of the projection image can be maintained without uniformly cooling the LEDs 102R, 102G, and 102B for the respective color lights.

For example, with the R-light LED 102R as reference, when the LEDs 102R, 102G, and 102B for the respective color lights are cooled to 30° C., the color balance of the projection image can be held. Contrary, in the construction of the exemplary embodiment, by allowing air to flow in the order of the R-light LED 102R, the G-light LED 102G, and the B-light LED 102B, the R-light LED 102R, the G-light LED 102G, and the B-light LED 102B are cooled more strongly in this order. Since the R-light LED 102R, the G-light LED 102G, and the B-light LED 102B are cooled more strongly in this order, the LEDs 102R, 102G, and 102B for the respective color lights can be cooled more efficiently compared to the case where the respective LEDs are cooled nearly uniformly. Accordingly, the color balance of the projection image can be held by the efficient cooling.

Further, by allowing the air to flow within the casing 116 using the cooling fan 120, the deterioration in illumination efficiency of the LEDs 102R, 102G, and 102B for the respective color lights can be reduced. Furthermore, when current is injected into the respective LEDs to the rated limit, similarly, there is no need to reduce the amount of current for color balance adjustment. Since there is no need to reduce the driving current of the respective LEDs, the projection image of the projector 100 will never become dark because of color balance adjustment.

Thus, even when there is some difference in the change in illumination efficiency with the temperature change depending on the wavelength characteristics of the LEDs, the projector 100 can reduce the change in the color balance of the projection image by the efficient cooling. Since there is no need to reduce the deterioration in illumination efficiency due to temperature rise, and further, reduce the driving current for color balance adjustment, a bright projection image can be obtained. Thereby, in the case where LEDs having different wavelength characteristics are used, the effect that a bright projection image with good color balance can be obtained by efficient cooling is exerted. Further, since the construction in which the air is allowed to sequentially pass the R-light LED 102R, the G-light LED 102G, and the B-light LED 102B is adopted, a projection image with good color balance is obtained by the simple construction. Furthermore, since the R-light LED 102R, the G-light LED 102G, and the B-light LED 102B can be cooled more strongly in this order, the respective LEDs can be cooled with strengths according to the amounts of change of illumination lights depending on the temperature change.

By providing the exhaust port 132 on the XY plane on which the projection lens 114 is provided, the air Wout is exhausted in the same direction as the projection direction of light by the projection lens 114. When the construction by which an observer observes the projection image from behind the projector 100 is adopted, the air Wout is exhausted in a direction opposite to the direction toward the observer. Thus, because the heated air from the projector 100 travels in the opposite direction to that toward the observer, the observer can view with comfort.

Exemplary Embodiment 2

Figure 2:
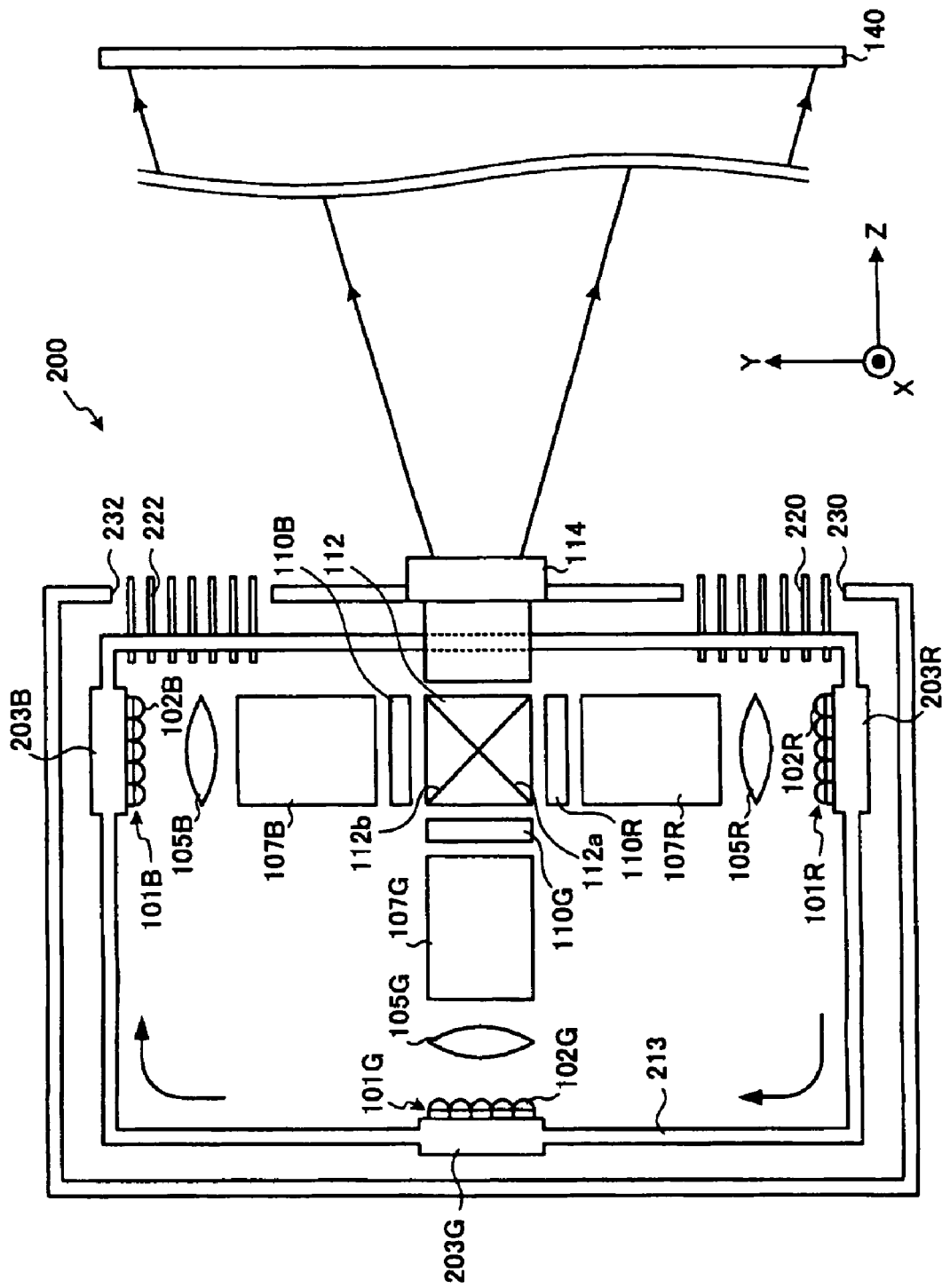
FIG. 2 is a schematic of the construction of the projector according to exemplary embodiment 2 of the invention.

FIG. 2 shows a schematic of a projector 200 according to exemplary embodiment 2 of the invention. The same parts as in the projector 100 of the above described exemplary embodiment 1 are assigned with the same signs and overlapping description will be omitted. The projector 200 of the exemplary embodiment is characterized by cooling the LEDs 102R, 102G, and 102B for the respective color lights by a liquid as a cooling fluid. In the exemplary embodiment, cooling water circulates in the cooling tube 213. The cooling water flows in a direction of an arrow within the cooling tube 213 by activating a pump (not shown), for example. The cooling tube 213 and the pump form a cooling fluid supply part to supply cooling water to the LEDs 102R, 102G, and 102B for the respective color lights.

The R-light LED 102R is provided at the opposite side to the light exit side in contact with the surface of an R-light LED cooling part 203R. The G-light LED 102G and the B-light LED 102B are provided similarly in contact with a G-light LED cooling part 203G and a B-light LED cooling part 203B, respectively. The cooling tube 213 is provided so as to connect the LED cooling parts 203R, 203G, and 203B for the respective color lights in a circular form. The LED cooling parts 203R, 203G, and 203B for the respective color lights are not limited to constructions in contact with the light exit surfaces of the LEDs 102R, 102G, and 102B for the respective color lights at the opposite side thereto. For example, a construction in which cooling water flows around the LEDs 102R, 102G, and 102B for the respective color lights may be adopted.

A casing 216 is provided with two opening portions 230 and 232. One opening portion 230 is provided on the XY plane on which the projection lens 114 is provided, near the R-light LED 102R in the casing 216. The other opening portion 232 is provided on the XY plane of the casing 216 near the B-light LED 102B. At the respective opening portions 230 and 232, the cooling tube 213 is provided with heat exchangers 220 and 222. The heat exchangers 220 and 222 release-heat of the cooling water passing within the cooling tube 213 into the air outside of the casing 216. As the heat exchangers 220 and 222, plate members made of metals can be used.

As the cooling tube 213, for example, a heat pipe formed by a metal member can be used. Forming the cooling tube 213 by a metal member can reduce or prevent infiltration of cooling water. Further, using the cooling tube 213 can release heat utilizing heat transfer by the metal member. The heat exchangers 220 and 222 may release the heat of the cooling water to the outside of the casing 216 and not limited to the plate member made of a metal. Furthermore, the heat exchangers 220 and 222 may be provided with cooling fans. Providing the heat exchangers 220 and 222 with cooling fans can release heat of the cooling water to the outside more efficiently. The heat exchangers 220 and 222 are not necessarily be provided if the heat can be released sufficiently using the cooling tube 213.

The cooling water that has released the heat to the outside at the heat exchangers 220 and 222 first passes the R-light LED cooling part 203R. At this time, the cooling water passing the R-light LED cooling part 203R flows while drawing the heat generated by the R-light LED 102R. The cooling water that has passed the R-light LED 102R travels in the cooling tube 213, and then, passes the G-light LED cooling part 203G. In the G-light LED cooling part 203G, the cooling water also flows while drawing the heat generated by the G-light LED 102G. Furthermore, the cooling water that has passed the G-light LED cooling part 203G travels in the cooling tube 213, and then, in turn, passes the B-light LED cooling part 203B.

Then, after flowing while drawing the heat generated by the B-light LED cooling part 203B, the cooling water releases heat to the outside via the heat exchangers 222 and 220. The cooling water thus flows in the cooling tube 213. By releasing heat of the cooling water at the opening portions 230 and 232, the heat from the respective LEDs is finally released into the atmosphere. The LEDs 102R, 102G, and 102B for the respective color lights can release heat by utilizing the heat transfer by the cooling water and allowing the cooling water to flow.

The cooling water sequentially passes through the R-light LED cooling part 203R, the G-light LED cooling part 203G, and the B-light LED cooling part 203B, and then, releases heat at the opening portions 230 and 232. Therefore, in the projector 200 of the exemplary embodiment as well as in the projector 100 of the above described exemplary embodiment 1, the R-light LED 102R, the G-light LED 102G, and the B-light LED 102B are also be cooled more strongly in this order. Thereby, in the case where LEDs having different wavelength characteristics, the effect that a bright projection image with good color balance can be obtained by efficient cooling is exerted.

The cooling liquid is not limited to water, and any suitable liquid can be used. Further, the cooling fluid flowing in the cooling tube 213 is not limited to a liquid, but a gas or a refrigerant with phase change of vaporization and liquefaction may be used. Especially, using water as the cooling fluid as in the exemplary embodiment can make the light source to have a construction with good environmental suitability and facilitate the maintenance of the light source.

Exemplary Embodiment 3

Figure 3:
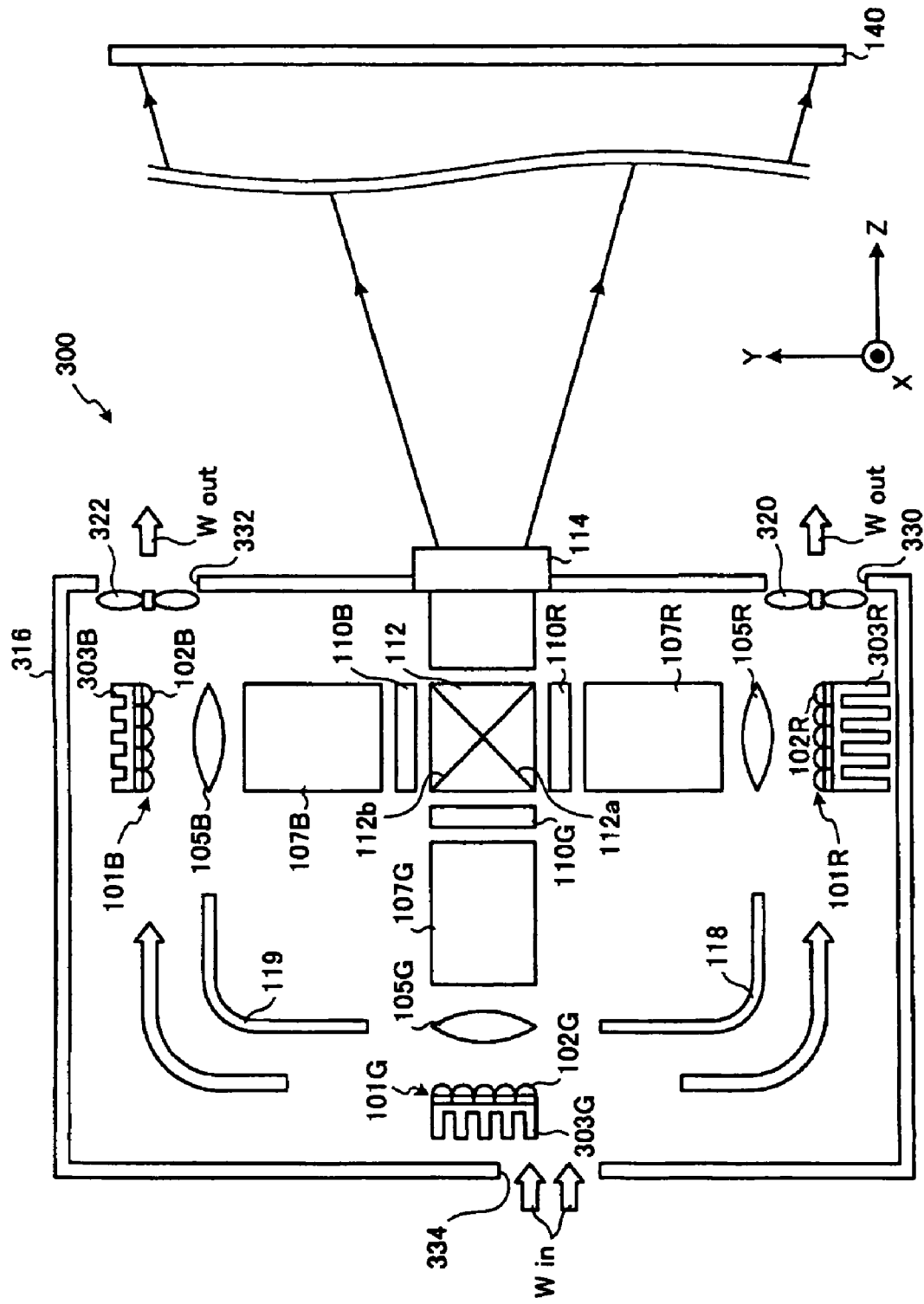
FIG. 3 is a schematic of the construction of the projector according to exemplary embodiment 3 of the invention.

FIG. 3 shows a schematic construction of a projector 300 according to the exemplary embodiment 3 of the invention. The same parts as in the projector 100 of the above described exemplary embodiment 1 are assigned with the same signs and overlapping description will be omitted. The projector 300 of the exemplary embodiment is characterized in that heat sinks 303R, 303G, and 303B different in size are provided with respect to each of the light source units 101R, 101G, and 101B for the respective color lights. The heat sinks 303R, 303G, and 303B are heat releasing parts to release heat from the LEDs 102R, 102G, and 102B for the respective color lights into the atmosphere in a positive manner.

The heat sink 303R provided in the R-light light source unit 101R is larger than the heat sinks 303G and 303B of the other light source units 101G and 101B. Further, the heat sink 303G provided in the G-light light source unit 101G is larger than the heat sink 303B provided in the B-light light source unit 101B. The larger surface areas the heat sinks 303R, 303G, and 303B have, the greater heat they can release. Further, by providing a large-scaled heat sink, large space can be secured on the rear side of the light source unit and a large amount of air can be used for releasing heat.

As the heat sinks are made larger, the amounts of heat release can be increased. Therefore, in the projector 300 of the exemplary embodiment as well as in the projector 100 of the above described exemplary embodiment 1, the R-light LED 102R, the G-light LED 102G, and the B-light LED 102B are cooled more strongly in this order. By appropriately setting the sizes of the respective heat sinks 303R, 303G, and 303B, the illumination lights of the LEDs 102R, 102G, and 102B for the respective color lights can be made into amounts of light within a predetermined range.

Further, LEDs 102R, 102G, and 102B for the respective color lights are easily cooled with strengths according to the amount of change of the illumination lights depending on the temperature changes of the LEDs 102R, 102G, and 102B for the respective color lights. Thereby, the effect that a bright projection image with good color balance can be obtained by the efficient cooling is exerted. The cooling strengths of the heat sinks 303R, 303G, and 303B can be set according to not only the sizes of the heat sinks 303R, 303G, and 303B, but also lengths, number, materials, or the like of heat release fins.

A casing 316 of the projector 300 of the exemplary embodiment has an intake port 334 and exhaust ports 330 and 332. The intake port 334 is provided near the G-light light source unit 101G. Further, one exhaust port 330 is provided near the R-light light source unit 101R. The other exhaust port 332 is provided near the B-light light source unit 101B. The exhaust ports 330 and 332 are provided with cooling fans 320 and 322.

Air Win as a cooling fluid flows from the outside of the casing 316 by driving the cooling fans 320 and 322, and exhausted from the exhaust ports 330 and 332. By the driving of the cooling fans 320 and 322, the LEDs 102R, 102G, and 102B for the respective color lights can be cooled more efficiently. The cooling fans 320 and 322 are not necessarily be provided if the LEDs 102R, 102G, and 102B or the respective color lights can be cooled sufficiently by the heat sinks 303R, 303G, and 303B.

Exemplary Embodiment 4

Figure 4:
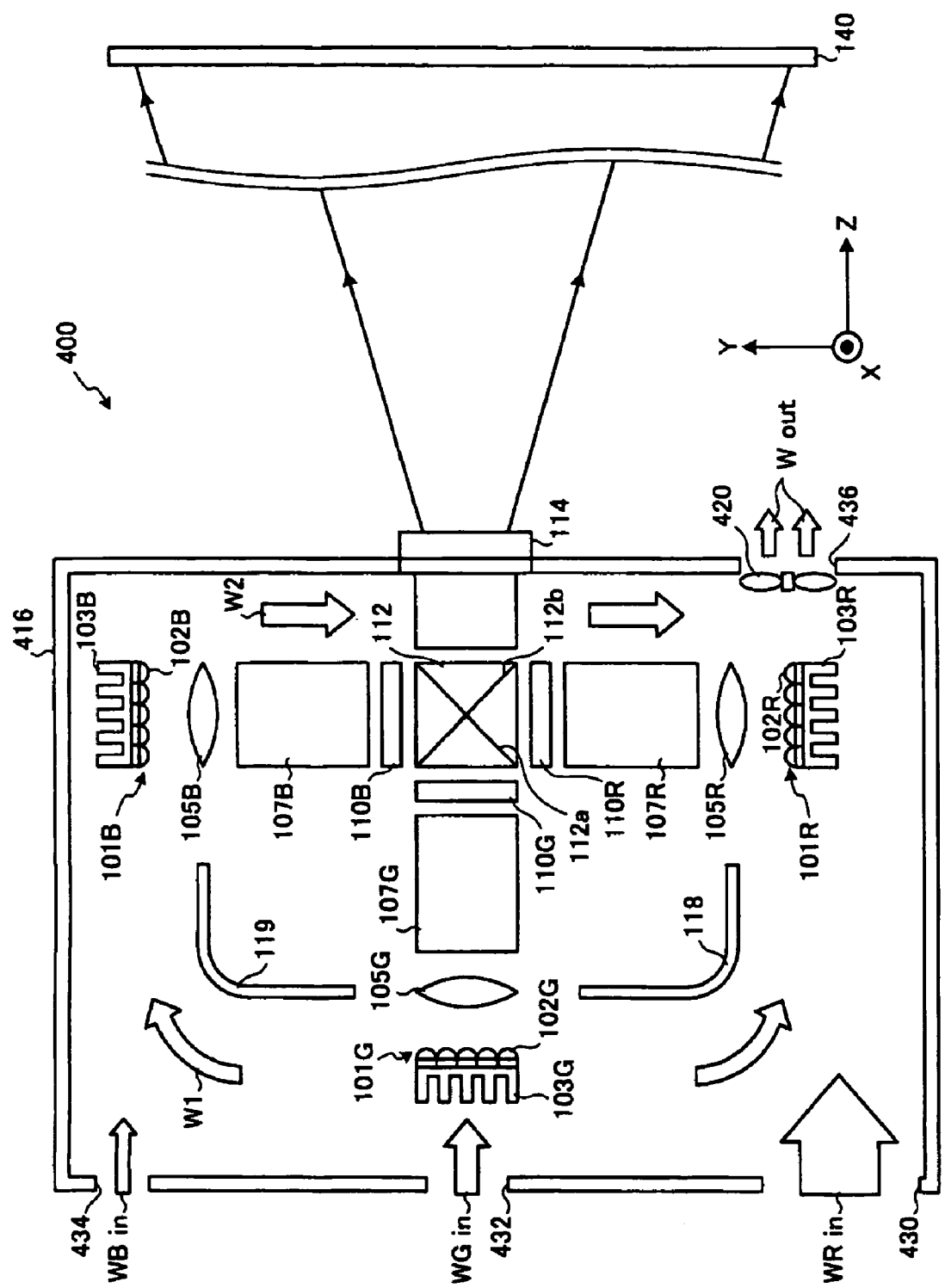
FIG. 4 is a schematic of the construction of the projector according to exemplary embodiment 4 of the invention.

FIG. 4 shows a schematic of a projector 400 according to exemplary embodiment 4 of the invention. The same parts as in the projector 100 of the above described exemplary embodiment 1 are assigned with the same signs and overlapping description will be omitted. The projector 400 of the exemplary embodiment is characterized by cooling the LEDs 102R, 102G, and 102B for the respective color lights with suitable strengths by adjusting opening areas and positions of three intake ports 430, 432, and 434, respectively.

A casing 416 of the projector 400 is provided with the three intake ports 430, 432, and 434 as cooling fluid inflow ports. The three intake ports 430, 432, and 434 are provided on the XY plane at the opposite side to the surface on which the projection lens 114 is provided in the casing 416. The first intake port 430 is provided in a position in a straight line from the R-light light source unit 101R in the minus Z direction opposite to the projection direction of the projection lens 114. The second intake port 432 is provided in a position near the G-light light source unit 101G.

The third intake port 434 is provided in a position in a straight line from the B-light light source unit 101B in the minus Z direction. Thus, the respective intake ports 430, 432, and 434 are provided in correspondence with the LEDs 102R, 102G, and 102B for the respective color lights. The first intake port 430 has an opening having a larger area than those of the second intake port 432 and the third intake port 434. Further, the second intake port 432 has an opening having larger area than that of the third intake port 434.

The casing 416 of the projector 400 is provided with one exhaust port 436. The exhaust port 436 is provided on the XY plane on which the projection lens 114 is provided in the casing 416 in a position near the R-light light source unit 101R. Therefore, the R-light light source unit 101R, the intake port 430, and the exhaust port 436 are arranged substantially in the same straight line. Further, the exhaust port 436 is provided with a cooling fan 420 as a cooling fluid supply part. By driving the cooling fan 420, air Wout as a cooling fluid is exhausted through the exhaust port 436 from inside of the casing 416.

Exhausted from the exhaust port 436 by the driving of the cooling fan 420, air WRin, WGin, and WBin as cooling fluids are taken from outside of the casing 416 through the three intake ports 430, 432, and 434. As described above, the first intake port 430 has the opening larger in area than the other intake ports 432 and 434. Accordingly, in a unit of time, the amount of air WRin flowing from the first intake port 430 into the casing 416 is larger than those of the air WGin and WBin flowing from other intake ports 432 and 434.

The air WRin flowing from the first intake port 430 by the driving of the cooling fan 420 travels in a straight line toward the cooling fan 420 and passes near the R-light LED 102R. The air that has passed near the R-light LED 102R draws heat generated by the R-light LED 102R and reaches the exhaust port 436 without change. The air WGin flowing from the second intake port 432 by the driving of the cooling fan 420 is first blown on the G-light LED 102G.

The air blown on the G-light LED 102G draws heat from the G-light LED 102G, and then, travels along the cooling guards 118 and 119 separately to the left and right. The air W1 traveling along the cooling guard 118 flows together with the air WRin from the intake port 430. The air W1 traveling along the cooling guard 119 flows together with the air WBin from the intake port 434. The air WBin flowing from the third intake port 434 by the driving of the cooling fan 420 flows together with the air W1 from the G-light LED 102G and travels in a straight line toward the B-light LED 102B.

The air passing near the B-light LED 102B draws heat generated by the B-light LED 102B and travels along the form of the casing 416 toward the cooling fan 420. Further, the air W2 traveling toward the cooling fan 420 passes near the projection lens 114, and then, reaches the exhaust port 436. The air Wout that has thus reached the exhaust port 436 is exhausted from the exhaust port 436 to the outside of the casing 416. The cooling fan 420 supplies air to the LEDs 102R, 102G, and 102B for the respective color lights by thus allowing air to flow within the casing 416.

As described above, the first intake port 430 has a larger opening in area than the other intake ports 432 and 434. Further, the air WRin flowing from the first intake port 430 travels nearly in a straight line from passing near the R-light LED 102R until being exhausted from the exhaust port 436. Both the air WGin flowing from the second intake port 432 and the air WBin flowing from the third intake port 434 take curved channels. Here, air contacts LEDs at higher speed and in greater amounts as the channels are closer to the straight lines. Since the opening of the first intake port 430 is larger than those of the other intake ports 432 and 434 and the air WRin flowing from the first intake port 430 travels nearly in a straight line, the R-light LED 102R is cooled more strongly than the LEDs 102G and 102B for other color lights.

As described above, the second intake port 432 has the larger opening in area than that of the third intake port 434. The distance from the second intake port 432 to the G-light LED 102G is shorter compared to the distance from the third intake port 434 to the B-light LED 102B. Since the distance from the intake port is shorter, the G-light LED 102G is cooled by the air before the temperature thereof rises. Since the opening of the second intake port 430 is larger than that of the third intake port 434 and the G-light LED 102G is nearer from the intake port, the G-light LED 102G is cooled more strongly than the B-light LED 102B.

By thus providing the respective intake ports 430, 432, and 434, a construction in which the R-light LED 102R, the G-light LED 102G, and the B-light LED 102B are cooled more strongly in this order can be formed. Further, by appropriately setting the opening areas and positions of the respective intake ports 430, illumination lights of the LEDs 102R, 102G, and 102B for the respective color lights can be made into amounts of light within a predetermined range. Further, a construction in which the LEDs 102R, 102G, and 102B for the respective color lights are cooled according to the amounts of change in illumination lights depending on the temperature changes of the LEDs 102R, 102G, and 102B for the respective color lights can be adopted. For example, a construction in which the respective LEDs can be cooled with suitable balance such that the R-light LED 102R may be at 30° C., the G-light LED 102G may be at 50° C., and the B-light LED 102B may be at 100° C., when the respective LEDs are in the thermal equilibrium state, can be adopted. Thereby, the effect that a bright projection image with good color balance can be obtained by efficient cooling is exerted.

As long as the opening areas and positions of the respective intake ports 430 have constructions that can cool the LED 102R, 102G, and 102B for the respective colors with suitable strengths, they are not limited to the illustrated ones. For example, the intake ports having nearly the same size may be provided or intake ports and exhaust ports may be provided on surfaces different from those illustrated. Further, as long as the air can be allowed to flow so that the LEDs 102R, 102G, and 102B for the respective color lights may be cooled with suitable strength, the cooling guard 118 and 119 are not necessarily provided. For example, in the case where LEDs are provided near the intake port, the air can be supplied to the respective LEDs without providing cooling guards.

Exemplary Embodiment 5

Figure 5:
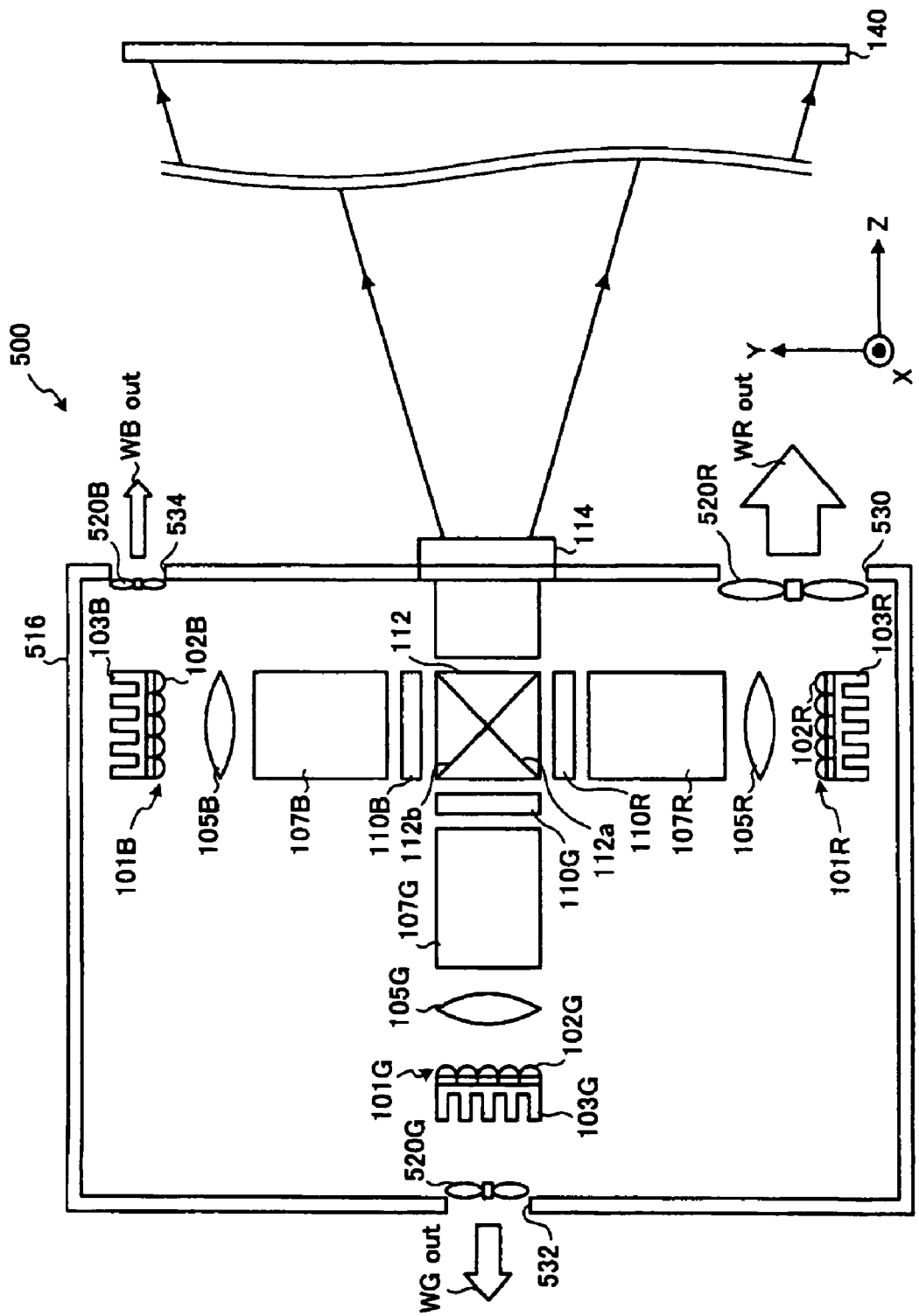
FIG. 5 is a schematic of the construction of the projector according to exemplary embodiment 5 of the invention.

FIG. 5 shows a schematic construction of a projector 500 according to exemplary embodiment 5 of the invention. The same parts as in the projector 100 of the above described exemplary embodiment 1 are assigned with the same signs and overlapping description will be omitted. The projector 500 of the exemplary embodiment is characterized by having three cooling fans 520R, 520G, and 520B that can be driven with each predetermined strength. The cooling fans 520R, 520G, and 520B are cooling fluid supply parts to supply air as a cooling fluid to the corresponding LEDs 102R, 102G, and 102B for the respective color lights.

A casing 516 of the projector 500 is provided with an intake port (not shown) and three exhaust ports 530, 532, and 534. The first exhaust port 530 is provided in a position near the R-light light source unit 101R. The second exhaust port 532 is provided in a position near the G-light light source unit 101G. The third exhaust port 534 is provided in a position near the B-light light source unit 101B. The respective exhaust ports 530, 532, and 534 are provided in correspondence with the nearby LEDs 102R, 102G, and 102B for the respective color lights.

The respective exhaust ports 530, 532, and 534 are provided with the first cooling fan 520R, the second cooling fan 520G, and the third cooling fan 520B, respectively. The respective cooling fans 520R, 520G, and 520B are driven so as to exhaust air from inside of the casing 516 at the respective exhaust ports 530, 532, and 534. When the air is exhausted from inside of the casing 516, external air flows into the casing 516 through the intake port.

The first cooling fan 520R provided in correspondence with the R-light LED 102R exhausts a larger amount of air than the other cooling fans 520G and 520B in a unit of time. Further, the second cooling fan 520G provided in correspondence with the G-light LED 102G exhausts a larger amount of air than the third cooling fan 520B corresponding to the B-light LED in a unit of time. Thus, the respective cooling fans are driven with each predetermined strength such that the amounts of the exhausted air are larger in the order of the first cooling fan 520R, the second cooling fan 520G, and the third cooling fan 520B. In FIG. 5, the respective cooling fans show driving strengths by their sizes. The strengths of the respective cooling fans can be set appropriately by rotation speeds and sizes of fin members.

The larger the amount of the air exhausted by the cooling fan in a unit of time, the stronger the LED is cooled. Therefore, in the projector 500 of the exemplary embodiment as well as in the projector 100 of the above described exemplary embodiment 1, the R-light LED 102R, the G-light LED 102G, and the B-light LED 102B are cooled more strongly in this order. By appropriately setting the strengths of the respective cooling fans 520R, 520G, and 520B, the illumination lights of the LEDs 102R, 102G, and 102B for the respective color lights can be made into amounts of light within a predetermined range.

Further, a construction in which the LEDs 102R, 102G, and 102B for the respective color lights are cooled according to the amounts of change in illumination lights depending on the temperature changes of the LEDs 102R, 102G, and 102B for the respective color lights, can be adopted. Thereby, the effect that a bright projection image with good color balance can be obtained by efficient cooling is exerted. Further, since the strengths of the respective cooling fans 520R, 520G, and 520B can be set appropriately, the amounts of driving of the respective cooling fans 520R, 520G, and 520B can be made into necessary and sufficient amounts. Thus, waste of power can be reduced compared to the case where the respective cooling fans 520R, 520G, and 520B are driven with equal strengths according to the cooling strength of the R-light LED 102R and efficient cooling can be performed.

As long as the respective cooling fans 520R, 520G, and 520B are provided in positions near the corresponding LEDs 102R, 102G, and 102B for the respective color lights, they are not limited to illustrated ones. For example, the respective cooling fans 520R, 520G, and 520B may be provided on other surfaces different from the construction illustrated. Furthermore, for example, the temperature of the light source units 101R, 101G, and 101B for the respective color lights is measured and the respective cooling fans 520R, 520G, and 520B may be feedback controlled according to the temperature. By the feedback control, the temperature of the LEDs 102R, 102G, and 102B for the respective color lights can be adjusted precisely.

As the cooling parts, in place of the cooling fans 520R, 520G, and 520B, for example, peltiert elements as thermoelectric conversion elements may be provided to the LEDs 102R, 102G, and 102B for the respective color lights. The peltiert element can be temperature controlled with predetermined strength by adjusting current to be supplied to a thermoelectric semiconductor. Accordingly, using the peltiert elements, the LEDs 102R, 102G, and 102B for the respective color lights can be cooled by each predetermined strength. Thereby, as well as in the case of using the cooling fans 520R, 520G, and 520B, illumination lights of the LEDs 102R, 102G, and 102B for the respective color lights can be made into amounts of light within a predetermined range.

Exemplary Embodiment 6

Figure 6:
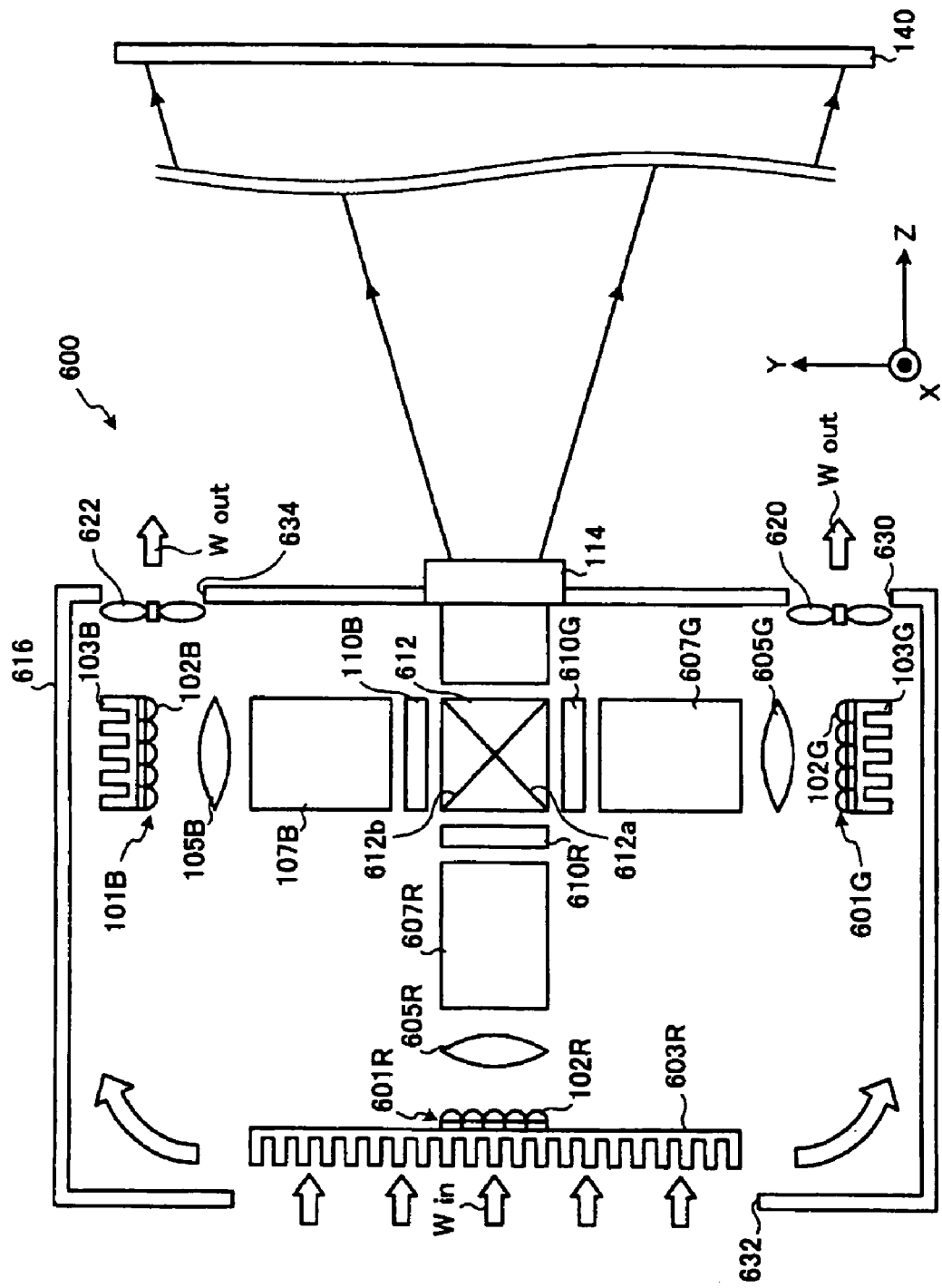
FIG. 6 is a schematic of the construction of the projector according to exemplary embodiment 6 of the invention.

FIG. 6 shows a schematic construction of a projector 600 according to the exemplary embodiment 6 of the invention. The same parts as in the projector 100 of the above described exemplary embodiment 1 are assigned with the same signs and overlapping description will be omitted. The projector 600 of the exemplary embodiment is characterized in that an R-light light source unit 601R is provided at an opposite side to the projection lens 114 relative to a dichroic prism 612. The R-light light source unit 601R is formed by assembly of plural R-light LEDs 102R. The G-light light source unit 601G is formed by assembly of plural G-light LEDs 102G. The R-light light source unit 601R is provided with a large-scaled heat sink 603R.

Compared to the projector 100 shown in FIG. 1, the projector 600 of the exemplary embodiment has a construction in which the R-light light source unit and the G-light light source unit are replaced with each other. The R light from the R-light LED 102R is transmitted through a collimator lens 605R and a rod integrator 607R, and then, modulated by a liquid crystal type spatial light modulator 610R as well as in the projector 100 of the above described exemplary embodiment 1. The G light from the G-light LED 102G is transmitted through a collimator lens 605G and a rod integrator 607G, and then, modulated by a liquid crystal type spatial light modulator 610G as well as in the projector 100 of the above described exemplary embodiment 1.

Here, using FIGS. 7 and 8 again, the characteristic of the cross dichroic prism 112 (see FIG. 1) of the projector 100 of the above described exemplary embodiment 1 and the characteristic of the cross dichroic prism 612 of the exemplary embodiment are compared. FIG. 7 shows the reflection characteristic of the cross dichroic prism 112 (see FIG. 1) of the above described exemplary embodiment 1. FIG. 8 shows the reflection characteristic of the cross dichroic prism 612 of the exemplary embodiment. In both of FIGS. 7 and 8, the longitudinal axis indicates the amount of reflection light and the lateral axis indicates the wavelength of light.

The cross dichroic prism 112 of the above described exemplary embodiment 1 is formed by combining a second dichroic film 112b to reflect light In in a wavelength range equal to or less than 500 nm and a first dichroic film 112a to reflect light Im equal to or more than 600 nm. A second dichroic film 612b of the cross dichroic prism 612 of the exemplary embodiment reflects light Ib in a low wavelength range equal to or less than 500 nm as well as the second dichroic film 112b of the above described exemplary embodiment 1. The second dichroic film 612b reflects B light and transmits G light and R light. A first dichroic film 612a of the exemplary embodiment reflects light Ia in a middle wavelength range of 500 to 600 nm. The first dichroic film 612a reflects G light and transmits R light and B light.

Turning back to FIG. 6, the dichroic prism 612 is formed by arranging the first dichroic film 612a and the second dichroic film 612b in an X shape. According to the reflection characteristic described using FIG. 8, the G light entering the cross dichroic prism 612 is reflected by the first dichroic film 612a and travels toward the projection lens 114. The R light entering cross dichroic prism 612 is transmitted through the first dichroic film 612a and the second dichroic film 612b and travels in a straight line toward the projection lens 114. The B light entering the cross dichroic prism 612 is reflected by the second dichroic film 612b and travels toward the projection lens 114. The cross dichroic prism 612 thus combines the respective color lights.

A casing 616 is provided with an intake port 632 and exhaust ports 630 and 634. The intake port 632 is provided on the XY plane opposite to the plane on which the projection lens 114 is provided in a position near the R-light LED 102R in the casing 616. Further, the exhaust ports 630 and 632 are provided on the XY plane on which the projection lens 114 is provided in the casing 616. The first exhaust port 630 is provided in a position near the G-light LED 102G. The second exhaust port 634 is provided in a position near the B-light LED 102B. The intake port 632 has an opening larger than any of the exhaust ports 630 and 632.

The exhaust ports 630 and 634 are provided with cooling fans 620 and 622 as cooling fluid supply parts, respectively. When the cooling fans 620 and 622 are driven, air Wout as a cooling fluid is exhausted from inside of the casing 116 through the exhaust ports 630 and 634. Then, when the air Wout is exhausted from the exhaust ports 630 and 634 by driving the cooling fans 620 and 624, air Win as a cooling fluid inflows from outside of the casing 116 at the intake port 632. The intake port 632 is a cooling fluid inflow port from which the cooling fluid flows.

The cross dichroic prism 612 combines the respective color lights by transmitting the R light and allowing it to travel in a straight line. Accordingly, the R-light light source unit 601R of the projector 600 of the exemplary embodiment is disposed at the opposite side to the projection lens 114 relative to the cross dichroic prism 612. An advantage obtained by disposing the R-light light source unit 101R at the opposite side to the projection lens 114 is that large space is easily secured around the R-light LED 102k. As shown in FIG. 6, large space can be secured around the R-light light source unit 101R in directions other than the plus Z direction in which a collimator lens 605R is provided. When the large space can be secured around the R-light LED 102R, a large amount of air for releasing heat can be secured and the amount of heat release can be enhanced. Further, since the heat sink 603R and the intake port 632 are easily made larger, the amount of heat release can be increased easily.

For example, as a comparative example with the exemplary embodiment, the case where the R-light light source unit 101R is provided in a position at the opposite side to the B-light light source unit 101B with the cross dichroic prism 612 in between is considered. At this time, in order to make the space around the R-light light source unit 101R larger, it is conceivable that the casing is formed so that the part of the R-light light source unit 101R may be larger. In this case, if the part of the B-light light source unit 101B is held in the size, the casing takes a left-right asymmetrical form and becomes unstable.

It is also conceivable that the space around the B-light light source unit 101B is also made larger in order to make the casing symmetrical. The B-light LED 102B is not necessarily cooled as strongly as the R-light LED 102R for making the respective color lights into amounts of light within a predetermined range. Accordingly, to make the space around the B-light light source unit 101B larger leads to provide wasted space. Therefore, according to the construction of the exemplary embodiment, large space can be provided around the R-light light source unit 101R without waste.

Further, by providing the intake port 632 near the R-light light source unit 101R, the air can be supplied to the R-light LED 102R earlier than LEDs of other color lights, and the R-light LED 102R can be cooled efficiently. According to the construction of the exemplary embodiment, the air Win flowing from the intake port 632 travels in a straight line in the Z direction, substantially the same direction after passing near the R-light LED 102R until being exhausted from the exhaust ports 630 and 634. By adopting the construction of allowing air Win to travel in a straight line from the intake port 632, a large amount of air Win at high speed can be supplied to the R-light LED 102R from the intake port 632. Accordingly, the R-light LED 102R is cooled more strongly than the other LEDs 102G and 102B for other color lights. Thereby, the effect that the R-light LED 102R with the largest amount of change in the amount of illumination light depending on the temperature change of the LED can be efficiently cooled is exerted.

In the above described respective exemplary embodiments, the constructions for cooling described in the above described exemplary embodiments can be used in appropriate combinations. By combining the constructions for cooling, not only they can be designed according to the construction of the projector, but also the cooling strengths can be set appropriately. In the above described respective exemplary embodiments, the light source units for the respective color lights are formed by providing plural LED. However, single LEDs may be provided. Further, as the light source parts for the respective color lights, not limited to LEDs, but solid light emitting elements other than LEDs may be used. The projectors of the above described respective exemplary embodiments are not limited to those of using three liquid crystal type spatial light modulators, but single liquid crystal type spatial light modulator may be used. Furthermore, as the spatial light modulator, not only a transmissive liquid crystal display device, but also a reflective liquid crystal display device or tilt mirror device may be used.

INDUSTRIAL APPLICABILITY

As described above, a projector according to the exemplary aspects of invention is useful for presentation and display of moving images.

What is claimed is:

1. A projector, comprising:
    a plurality of light source parts to supply illumination lights;
    a cooling part to cool the light source parts so as to make the light source parts within a predetermined temperature;
    spatial light modulators to modulate the illumination lights from the light source parts according to image signals; and
    a projection lens to project the lights modulated by the spatial light modulators,
    the light source parts providing different amounts of the illumination lights that change depending on temperature changes of the light source parts, and
    the predetermined temperature is a temperature at which the light source parts supply predetermined ratio of the illumination light compared with the amounts of the illumination light the light source parts supply when the light source parts are at a reference temperature.

2. The projector according to claim 1, the cooling part cooling the light source parts with strengths according to amounts of change in the amounts of the illumination lights depending on the temperature changes of the light source parts.

3. The projector according to claim 1, the light source parts including a red-light light source part to supply the illumination light as red light, and
    the cooling part cooling the red-light light source part with strength larger than the strengths to cool the light source parts other than the red-light light source part.

4. The projector according to claim 1, the cooling part being a cooling fluid supply part to supply a cooling fluid to the light source parts, and
    the cooling fluid supply part supplying the cooling fluid so as to allow the cooling fluid to pass the light source parts in decreasing order of amounts of change of the illumination lights depending on the temperature changes of the light source parts.

5. The projector according to claim 1, comprising a plurality of the cooling parts,
    the cooling parts being provided in correspondence with the light source parts.

6. A projector according to claim 5, the cooling parts being heat releasing parts to release heat from the corresponding light source parts.

7. The projector according to claim 5, the cooling parts being cooling fluid supply parts to supply a cooling fluid to the corresponding light source parts.

8. The projector according to claim 1, further comprising:
    cooling fluid inflow ports provided in correspondence with the light source parts,
    the cooling part being a cooling fluid supply part to supply a cooling fluid to the light source parts, and
    the cooling fluid inflow ports having openings with predetermined areas, and further provided in predetermined positions in relation to the corresponding light source parts.

9. The projector according to claim 1, the light source parts including a first color-light light source part to supply the illumination light as a first color light, a second color-light light source part to supply the illumination light as a second color light, and a third color-light light source part to supply the illumination light as a third color light,
    further comprising:
    a light combining system having a first dichroic film to reflect the second color light and transmit the first color light and the third color light and a second dichroic film to reflect the third color light and transmit the first color light and the second color light to combine the first color light, the second color light, and the third color light to output the light in a direction toward the projection lens; and
    a cooling fluid inflow port provided near the first color-light light source part into which the cooling fluid flows,
    the first color-light light source part providing a larger amount of change in the amount of the illumination light depending on the temperature change of the light source part compared to the second color-light light source part and the third color-light light source part, and
    the light combining system being provided between the first color-light light source part and the projection lens.

* * * * *

UNITED STATES PATENT AND TRADEMARK OFFICE
CERTIFICATE OF CORRECTION

| | | |
|---|---|---|
| PATENT NO. | : 7,384,151 B2 | Page 1 of 1 |
| APPLICATION NO. | : 11/074638 | |
| DATED | : June 10, 2008 | |
| INVENTOR(S) | : Hideya Seki | |

It is certified that error appears in the above-identified patent and that said Letters Patent is hereby corrected as shown below:

On the Title Page (30)

Please add the Foreign Application Priority Data:

March 10, 2004     (JP) .................... 2004-067231

Signed and Sealed this

Twenty-sixth Day of August, 2008

JON W. DUDAS
*Director of the United States Patent and Trademark Office*